US008585401B2

(12) United States Patent
Moses

(10) Patent No.: US 8,585,401 B2
(45) Date of Patent: Nov. 19, 2013

(54) MOUTHPIECE FOR ATHLETIC PERFORMANCE ENHANCEMENT

(76) Inventor: Allen J. Moses, Chicago, IL (US)

( * ) Notice: Subject to any disclaimer, the term of this patent is extended or adjusted under 35 U.S.C. 154(b) by 0 days.

(21) Appl. No.: 13/399,726

(22) Filed: Feb. 17, 2012

(65) Prior Publication Data
US 2013/0213412 A1 Aug. 22, 2013

(51) Int. Cl.
A61C 9/00 (2006.01)

(52) U.S. Cl.
USPC .............................................. 433/37

(58) Field of Classification Search
USPC ......... 128/848, 861, 862; 433/6, 37, 213, 214
See application file for complete search history.

(56) References Cited

U.S. PATENT DOCUMENTS

| 5,259,762 | A | 11/1993 | Farrell |
| 5,313,960 | A | 5/1994 | Tomasi |
| 5,562,106 | A | 10/1996 | Heeke et al. |
| 5,873,365 | A | 2/1999 | Brown |
| 6,152,138 | A | 11/2000 | Brown et al. |
| 6,675,806 | B2 | 1/2004 | Kittelsen et al. |
| 6,675,807 | B2 | 1/2004 | Kittelsen et al. |
| D496,498 | S | 9/2004 | Kittelsen et al. |
| 6,837,246 | B1 | 1/2005 | DeLuke |
| 7,637,262 | B2 | 12/2009 | Bailey |
| 7,798,149 | B2 | 9/2010 | Haduong |
| 7,861,722 | B2 | 1/2011 | Keropian |
| 7,861,724 | B2 | 1/2011 | Keropian |
| 7,882,839 | B2 | 2/2011 | Ambis, Jr. |
| 7,975,701 | B2 | 7/2011 | Bergersen |
| 2010/0051038 | A1 | 3/2010 | Quigless |
| 2011/0209714 | A1 | 9/2011 | Makkar et al. |

OTHER PUBLICATIONS

Garner et al., "Effects of Mouthpiece Use on Airway Openings and Lactate Levels in Healthy College Males," Compend. Contin. Educ. Dent., vol. 30, Issue 2, 9-13 (Jul.-Aug. 2009).
Garner et al., "The Effects of Mouthpiece Use on Gas Exchange Parameters During Steady-State Exercise in College-Aged Men and Women," J. Am. Dent. Assoc., vol. 142, Issue 9, 1041-1047 (Sep. 2011).
Garner et al., "Effects of Mouthpiece Use on Auditory and Visual Reaction Time in College Males and Females," Compend. Contin. Educ. Dent., vol. 30, Issue 2, 14-17 (Jul.-Aug. 2009).
Arent et al., "Effects of Neuromuscular Dentistry-Designed Mouthguard on Muscular Endurance and Anaerobic Power," Comparative Exercise Physiology, vol. 7, Issue 2, 81-87 (May 2010).
Roettger, "Performance Enhancement and Oral Appliances," Compend. Contin. Educ. Dent., vol. 30, Issue 2, 4-8 (Jul.-Aug. 2009).

Primary Examiner — Sunil K Singh
(74) Attorney, Agent, or Firm — Marshall, Gerstein & Borun LLP

(57) ABSTRACT

A bio-facilitation mouthpiece correlates a custom made mouthpiece with nervous system channeling to facilitate optimal physiologic activity. The mouthpiece may be a single, unitary part made from a flexible, resilient material, and the mouthpiece includes a base member, and a right and left flange member coupled to the base member. The base member is adapted to receive portions of a user's upper and lower teeth, and the base member includes an elongated right lateral engagement portion, an elongated left lateral engagement portion, and an arch-shaped forward portion disposed between the right and left lateral engagement portions. The base member additionally includes a skirt portion downwardly extending from the forward portion and the right and left lateral engagement portions.

4 Claims, 8 Drawing Sheets

MOUTHPIECE FOR ATHLETIC PERFORMANCE ENHANCEMENT

FIELD OF THE DISCLOSURE

This disclosure relates generally to dentistry, and, more particularly, to a custom fitted laboratory fabricated athletic mouthpiece and a method of making said mouthpiece.

BACKGROUND

There are numerous mouthpieces that claim to enhance performance. The operative concept is that by enhancing muscle strength they can increase performance. The problem is that an oral appliance cannot increase muscle strength. Doctors can tell when a muscle is functioning at optimal levels and posturally position muscles to function at optimal levels but they cannot make the muscles stronger with a mouthpiece nor does increased strength necessarily reflect performance.

There is a complex interrelationship between breathing, head posture, tongue function, swallowing, the position of the teeth in the mouth and where they touch in function. Placing any device in the mouth changes the tongue posture, the shape of the airway, and the posture of the head on the spinal column. Oral appliances placed in the maxilla, especially those that contact the palate, take up space for the tongue, cause a lowered and retruded tongue position, reduce airway patency, and alter normal swallow.

Typical oral appliances used to enhance performance often extend entirely across the upper and lower dental arches. The resultant blocking of the anterior region of the mouth prevents a user from drinking liquids while wearing the oral appliance and also interferes with the user's ability to speak clearly and breathe easily while wearing the oral appliance. In addition, such oral appliances are bulky and uncomfortable, and users typically remove the oral appliances as often as practical. In oral appliances that have a reduced thickness to allow for greater ease of speaking and/or breathing while wearing the appliance, trauma protection is reduced and concussions resulting from the upper portion of the mandible contacting the brain may result.

Accordingly, there is a need for a performance enhancing mouthpiece that allows physiologic and neurologic function at optimal levels while also being comfortable, protecting the user from concussions, and allowing a user to drink liquids, breathe, and speak clearly with the mouthpiece inserted.

BRIEF SUMMARY OF THE DISCLOSURE

In accordance with one exemplary aspect of the present invention, a bio-facilitation mouthpiece includes a base member, a right flange member, and a left flange member. The base member is adapted to receive portions of a user's upper and lower teeth, and the base member includes an elongated right lateral engagement portion having a first end and a second end opposite the first end. The right lateral engagement portion has a top portion and a bottom portion, the top portion includes a plurality of surface impressions that correspond to the size and shape of a bottom portion of one or more of the user's upper right posterior teeth. The bottom portion includes a plurality of surface impressions that correspond to the size and shape of a top portion of one or more of the user's lower right posterior teeth. The base member also includes an elongated left lateral engagement portion having a first end and a second end opposite the first end, the left lateral engagement portion having a top portion and a bottom portion, the top portion including a plurality of surface impressions that correspond to the size and shape of a bottom portion of one or more of the user's upper left posterior teeth. The bottom portion includes a plurality of surface impressions that correspond to the size and shape of a top portion of one or more of the user's lower left posterior teeth. The base member further includes an arch-shaped forward portion having a first end disposed adjacent to the first end of the right lateral engagement portion and a second end disposed adjacent to the first end of the left lateral engagement portion such that the forward portion, the right lateral engagement portion, and the left lateral engagement portion has a U-shape when viewed along a vertical axis. The base member additionally includes a skirt portion downwardly extending from each of the forward portion, the right lateral engagement portion, and the left lateral engagement portion. The skirt portion has an inside surface and an outside surface, and the outside surface generally conforms in shape to an inside surface of a plurality of lower teeth of the user and an upper portion of the lower gum line of the user. The surface impressions of the top portions of each of the right lateral engagement portion and the left lateral engagement portion are vertically spaced from the surface impressions of the bottom portion of the right lateral engagement portion and the left lateral engagement portion by a distance of at least 3 mm to absorb an upward impact force on the user's mandible in a manner that prevents concussions. The bio-facilitation mouthpiece also includes a right flange member coupled to the base member adjacent to the right lateral engagement portion and a left flange member coupled to the base member adjacent to the left lateral engagement portion.

In accordance with another exemplary aspect of the present invention, a method of fabricating a bio-facilitation mouthpiece for a user includes identifying a user's maxillomandibular position of minimal nociceptive input and creating an impression of the user's upper and lower anterior teeth in the maxillomandibular position of minimal nociceptive input. The method further includes creating a bio-facilitation mouthpiece from the impression of the user's upper and lower anterior teeth in the maxillomandibular position of minimal nociceptive input, wherein the user's maxillomandibular position of minimal nociceptive input is maintained by the bio-facilitation mouthpiece when the user wears the bio-facilitation mouthpiece.

DETAILED DESCRIPTION

The disclosed bio-facilitation mouthpiece correlates a flexible, custom made mouthpiece with nervous system channeling to facilitate optimal physiologic and neurologic activity. A method and device is provided for registering the appropriate head, mouth, pharyngeal and body posture to facilitate optimal performance of physiologic and neurologic movement, biomechanical balance, range of motion and airway patency for human beings. A custom laboratory fabricated mouthpiece is provided to establish this position of bio-neurologic facilitation.

Figure 2:
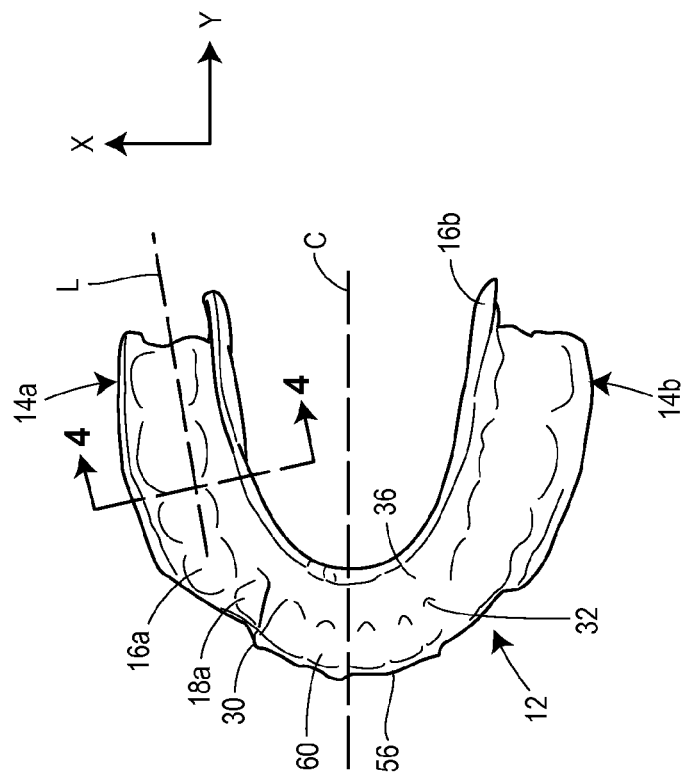
FIG. 2 is a top view of the embodiment of FIG. 1.
Figure 1:
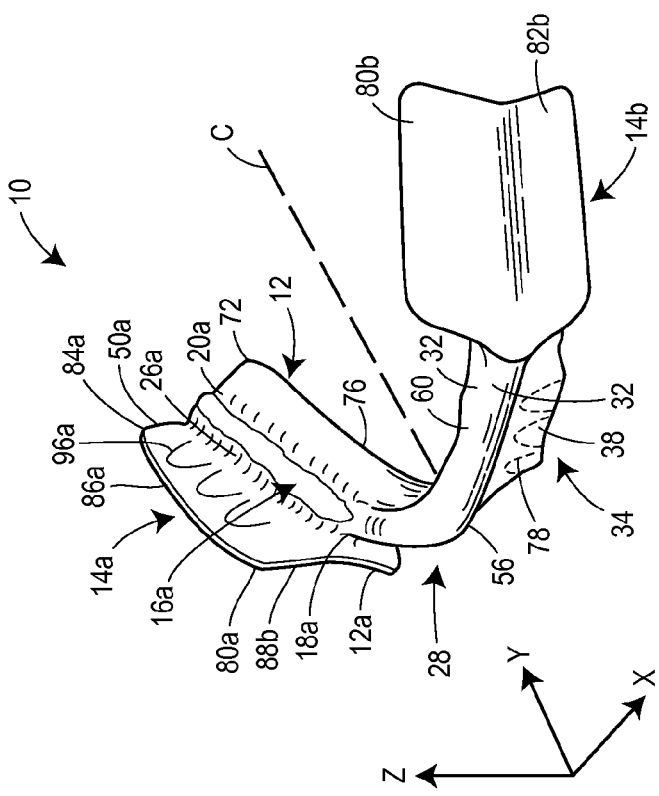
FIG. 1 is a perspective top view of an embodiment of a bio-facilitation mouthpiece.
Figure 3:
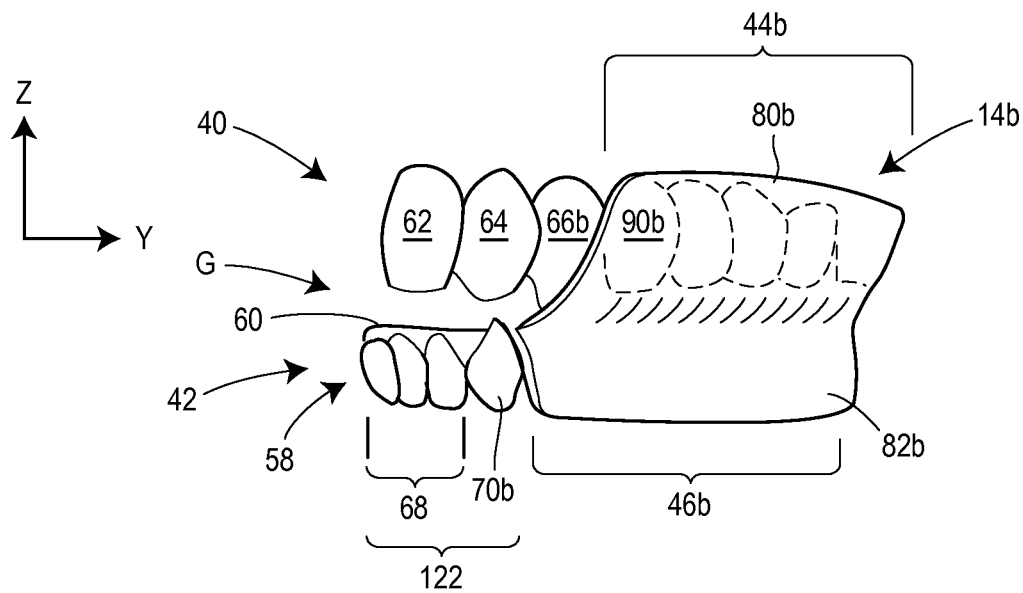
FIG. 3 is a left side view of the embodiment of FIG. 1 disposed in a user's mouth.
Figure 4:
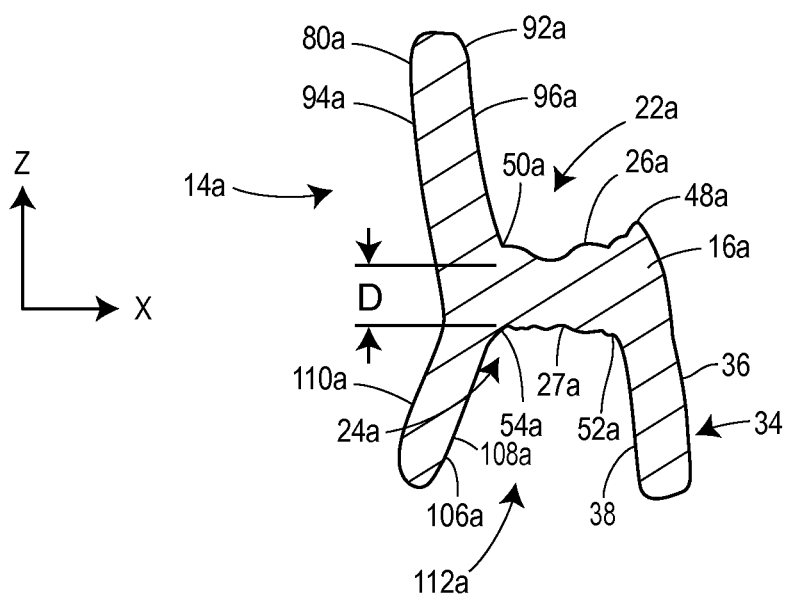
FIG. 4 is a cross-sectional view taken along section line 4-4 of FIG. 3.
Figure 5:
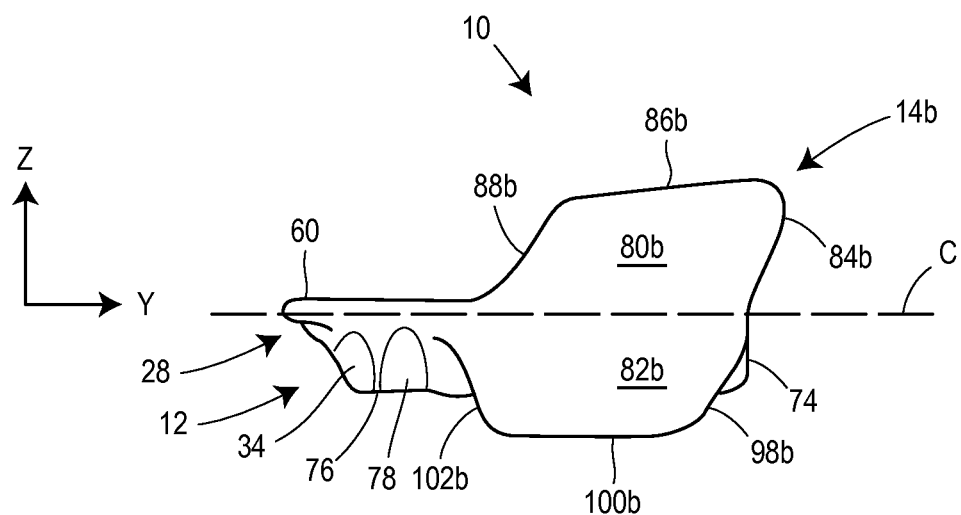
FIG. 5 is a left side view of the embodiment of FIG. 1.

An embodiment of such a bio-facilitation mouthpiece 10 is illustrated in FIGS. 1 to 6 and 8 to 10, and the bio-facilitation mouthpiece 10 includes a base member 12, a right flange member 14a, and a left flange member 14b. The bio-facilitation mouthpiece 10 may be a single, unitary part made from a flexible, resilient material. As illustrated in FIGS. 1 and 2, the base member 12 is adapted to receive portions of a user's upper and lower teeth, and the base member 12 includes an elongated right lateral engagement portion 16a having a first end 18a and a second end 20a opposite the first end 18a. As illustrated in FIGS. 1, 2, and 4, the right lateral engagement portion 16a has a top portion 22a and a bottom portion 24a, the top portion 16a including a plurality of surface impressions 26a that correspond to the size and shape of a bottom portion of one or more of the user's upper right posterior teeth. The bottom portion 24a includes a plurality of surface impressions 27a that correspond to the size and shape of a top portion of one or more of the user's lower right posterior teeth. The base member 12 also includes an elongated left lateral engagement portion 16b having a first end 18b and a second end 20b opposite the first end 18b, the left lateral engagement portion 16b having a top portion 22b and a bottom portion 24b, the top portion 22b including a plurality of surface impressions 26b that correspond to the size and shape of a bottom portion of one or more of the user's upper left posterior teeth. The bottom portion 24b includes a plurality of surface impressions 27b that correspond to the size and shape of a top portion of one or more of the user's lower left posterior teeth.

Referring to FIGS. 1 and 2, the base member 12 further includes an arch-shaped forward portion 28 having a first end 30 disposed adjacent to the first end 18a of the right lateral engagement portion 16a and a second end 32 disposed adjacent to the first end 18b of the left lateral engagement portion 16b such that the forward portion 28, the right lateral engagement portion 16a, and the left lateral engagement portion 16b has a U-shape when viewed along a vertical axis. As illustrated in FIG. 3, the forward portion 28 includes a top surface 60 disposed adjacent to a top edge of one or more of the user's lower anterior teeth 122 such that a vertical gap G exists between the top surface 60 and a bottom edge of each of the user's upper central incisors 62. As illustrated in FIGS. 1, 2, 4, and 5, the base member 12 additionally includes a skirt portion 34 downwardly extending from each of the forward portion 28, the right lateral engagement portion 16a, and the left lateral engagement portion 16b. The skirt portion 34 has an inside surface 36 and an outside surface 38, and the outside surface 38 generally conforms in shape to an inside surface of a plurality of lower teeth of the user and an upper portion of the lower gum line of the user. As illustrated in FIG. 4, the surface impressions 26a, 26b of the top portions 22a, 22b of each of the right lateral engagement portion 16a and the left lateral engagement portion 16b are vertically spaced from the surface impressions 27a, 27b of the bottom portion 24a, 24b of the right lateral engagement portion 16a and the left lateral engagement portion 16 by a distance of at least 2 mm to absorb an upward impact force on the user's mandible in a manner that prevents concussions. As illustrated in FIGS. 1 and 2, the bio-facilitation mouthpiece 10 also includes a right flange member 14a coupled to the base member 12 adjacent to the right lateral engagement portion 16a and a left flange member 14b coupled to the base member 12 adjacent to the left lateral engagement portion 16b.

Configured as described, the bio-facilitation mouthpiece 10 provides an open anterior portion (illustrated in FIG. 3) that allows the user to drink liquids while wearing the bio-facilitation mouthpiece 10. The open anterior portion also allows the user to talk and breathe comfortably and clearly, eliminating the need for the user to frequently remove the bio-facilitation mouthpiece 10 while participating in athletic activities. The bio-facilitation mouthpiece 10 also has a relatively small size that increases tongue space in the user's mouth to allow the user to speak more clearly with the bio-facilitation mouthpiece 10 inserted. Moreover, the bio-facilitation mouthpiece 10 enhances athletic performance by facilitating optimal neurological function because it maintains an optimal maxillomandibular relationship that minimizes nociceptive input (or maximal neurological bio-facilitation). The bio-facilitation mouthpiece 10 also provides protection against concussions. In addition, the bio-facilitation mouthpiece 10 may have profound effects on such a diverse and wide range of human physiologic functions or dysfunctions as TMJ pain, headaches, neck pain, daytime airway patency. Additionally, the bio-facilitation mouthpiece 10 may treat certain movement disorders, enhance isometric posture, head balance, and athletic performance by reducing nociceptive neurological interference.

Turning to the detailed structure of the bio-facilitation mouthpiece 10 illustrated in FIGS. 1 to 4, the bio-facilitation mouthpiece 10 includes a base member 12 that may be adapted to receive portions of a user's upper 40 and lower teeth 42, and the base member 12 may include the right lateral engagement portion 16a and the left lateral engagement portion 16b. The right lateral engagement portion 16a may include the top portion 22a and the bottom portion 24a, and the top portion 22a may include a plurality of surface impressions 26a that correspond to the size and shape of a bottom portion of one or more of the user's upper right posterior teeth 44a. For example, the top portion of the right lateral engagement portion may include a plurality of surface impressions that correspond to a bottom portion of each of the user's upper right third molar, the upper right second molar, the upper right first molar, the upper right second premolar, and the upper right first premolar. The bottom portion 24a of the right lateral engagement portion 16a may be disposed opposite the top portion 22a, and the bottom portion 24a may include a plurality of surface impressions 27a that correspond to the size and shape of a bottom portion of one or more of the user's lower right posterior teeth 46a. For example, the bottom portion of the right lateral engagement portion 16a may include a plurality of surface impressions 26a that correspond to a bottom portion of each of the user's lower right third molar, the lower right second molar, the lower right first molar, the lower right second premolar, and the lower right first premolar.

The right lateral engagement portion 16a may have any suitable shape that accommodates the desired number of surface impressions 26a. For example, the right lateral engagement portion 16a may be elongated and may have a slightly curved shape when viewed along a vertical axis (i.e., the Z-axis provided in the reference coordinate system of FIG. 1) such that the right lateral engagement portion 16a generally conforms to the shape collectively formed by the upper and lower right posterior teeth 44a, 46a (i.e., the molars and premolars) when viewed along a vertical axis. The right lateral engagement portion 16a may be generally elongated along a longitudinally extending line L (illustrated in FIG. 2) generally disposed in a plane normal to the vertical axis, and the line L may be slightly curved to correspond to the general shape of an axis of symmetry that longitudinally bisects the upper and/or lower right posterior teeth 44a, 46a when viewed along a vertical axis. The elongated right lateral engagement portion 16a may have the first end 18a and the second end 20a opposite the first end 18a. The first end 18a may be disposed at or adjacent to a surface impression 26a that corresponds to the first or second premolars, and the second end 20a may be disposed at or adjacent to a surface impression 26a that corresponds to the first or second molars. The right lateral engagement portion 16a may have any suitable width that allows the surface impressions 26a, 27a to be formed on each of the top portion 22a and the bottom portion 24a. For example, an area of the top portion 22a that extends longitudinally along an inside edge 48a of the top portion 22a may be free from surface impressions, and/or an area of the top portion 22a that extends longitudinally along an outside edge 50a of the top portion 22a may be free from surface impressions. In addition (or alternatively), an area of the bottom portion 24a that extends longitudinally along an inside edge 52a of the bottom portion 24a may be free from surface impressions, and/or an area of the bottom portion 24a that extends longitudinally along an outside edge 54a of the bottom portion 24a may be free from surface impressions. Alternatively, the surface impressions on the top portion 22a and/or the bottom portion 24a may extend to the inside edge 48a, 52a and/or the outside edge 50a, 54a such that no longitudinal space exists.

FIG. 4 illustrates a cross-section of the right lateral engagement portion 16a that is normal to the line L of FIG. 2. In such a cross-section, the right lateral engagement portion 16a may have a generally elongated shape extending generally along or parallel to the X-axis of the reference coordinate system of FIG. 1. The top portion 22a and the surface that defines the surface impressions 26a in the top portion 22a may define an upper boundary of the elongated cross-sectional shape, thereby giving the upper boundary an irregular and generally contoured shape. Similarly, the bottom portion 24a and the surface that defines the surface impressions 27a in the bottom portion 24a define a lower boundary of the elongated cross-sectional shape, thereby giving the lower boundary an irregular and generally contoured shape. The surface impressions 26a formed on the top portion 22a and the surface impressions 27a formed on the bottom portion 24a may be vertically (i.e., along or parallel to the Z-axis provided in the reference coordinate system of FIG. 1) separated by a minimum distance D to allow the resilient material comprising the mouthpiece to absorb an upward impact force on the user's mandible. The minimum distance D corresponds to the vertical distance between the lowermost (i.e., the portion of the surface impressions closest to the X-axis in the provided reference coordinate system of FIG. 4) portion of the surface impressions 26a of the top portion 22a and the uppermost (i.e., the portion of the surface impressions closest to the X-axis in the provided reference coordinate system of FIG. 4) portion of the surface impressions 27a of the bottom portion 24a. The absorption of such an upward blow by the material between the surface impressions 26a formed on the top portion 22a and the surface impressions 27a formed on the bottom portion 24a may prevent a rear portion of the user's mandible from perforating the brain, thereby preventing a concussion. The minimum distance D may be at least about 3 mm, and may be between about 3 mm and about 8 mm. Preferably, the minimum distance D may be between about 4 mm and 5 mm.

As discussed above and as illustrated in FIGS. 1 to 3, the base member 12 may also include the left lateral engagement portion 16b. The left lateral engagement portion 16b may be a mirror-image (i.e., may be symmetrical or generally symmetrical about a central axis C that is parallel to or collinear with the Y-axis of the reference coordinate system provided in FIG. 1) of the right lateral engagement portion 16a described above, but the left lateral engagement portion 16b may be adapted to receive a bottom portion of one or more of the user's upper left posterior teeth 44b and lower left posterior teeth 46b. Specifically, the left lateral engagement portion 16b has the top portion 22b and the bottom portion 24b, and the top portion 22b includes a plurality of surface impressions 26b that correspond to the size and shape of a bottom portion of one or more of the user's upper left posterior teeth 44b. For example, the top portion 22b of the left lateral engagement portion 16b may include a plurality of surface impressions 26b that correspond to upper left third molar, the upper left second molar, the upper left first molar, the upper left second premolar, and the upper left first premolar. The bottom portion 24b of the left lateral engagement portion 16b may be disposed opposite the top portion 22b, and the bottom portion 24b includes a plurality of surface impressions 27b that correspond to the size and shape of a bottom portion of one or more of the user's lower left posterior teeth 46b. For example, the bottom portion 24b of the left lateral engagement portion 16b may include a plurality of surface impressions 27b that correspond to the lower left third molar, the lower left second molar, the lower left first molar, the lower left second premolar, and the lower left first premolar.

The left lateral engagement portion 16b may have any suitable shape that accommodates the desired number of surface impressions. For example, the left lateral engagement portion may be elongated and may have a slightly curved shape when viewed along a vertical axis such that the left lateral engagement portion 16b generally conforms to the shape collectively formed by the upper and lower left posterior teeth 44b, 46b when viewed along a vertical axis. The elongated left lateral engagement portion 16b may include the first end 18b and the second end 20b opposite the first end 18b. The first end 18b may be disposed at or adjacent to a surface impression that corresponds to the first or second premolars, and the second end may be disposed at or adjacent to a surface impression that corresponds to the first or second molars. The left lateral engagement portion 16b may have any suitable width that allows the surface impressions to be formed on each of the top portion 22b and the bottom portion 24b, as explained in the discussion of the right lateral engagement portion 16a. The left lateral engagement portion 16b may have a cross-sectional shape that is a mirror image of the cross-section of right lateral engagement portion 16a illustrated in FIG. 4. As explained in the discussion of the right lateral engagement portion 16a, the surface impressions 26b formed on the top portion 22b and the surface impressions 27b formed on the bottom portion 24b may be vertically separated by a minimum distance D to allow the resilient material comprising the mouthpiece to absorb an upward impact force on the user's mandible. The minimum distance D may be at least about 3 mm, and may be between about 3 mm and about 8 mm. Preferably, the minimum distance D may be between about 4 mm and 5 mm.

As illustrated in FIGS. 1 to 3, 5, 8, 9 and 10, the base member may also include a forward portion 28 that may have the general shape of an arch when viewed parallel to or along a vertical axis (the Z-axis of the reference coordinate system of FIG. 1). The forward portion 28 may include the first end 30 disposed at or adjacent to the first end 18a of the right lateral engagement portion 16a and the second end 32 disposed at or adjacent to the first end 18b of the left lateral engagement portion 16b. So disposed, the forward portion 28, the right lateral engagement portion 16a, and the left lateral engagement portion 16b may have a U-shape when viewed parallel to or along a vertical axis. A forward edge 56 of the forward portion 28 may be contoured to correspond to the shape of the interior surface of a user's lower posterior teeth 58. More specifically, the forward edge 56 may be shaped to correspond to a rear surface of an upper portion of a lower left canine 70b, each of the lower incisors 68, and a lower right canine 70a. So disposed, the forward edge 56 may contact or may be immediately adjacent to the rear surface of the upper portion of the lower left canine 70b, each of the lower incisors 68, and a lower right canine 70a. Moreover, as illustrated in FIG. 3, a top surface 60 of the forward portion 28 may be disposed adjacent to a top edge of one or more of the of the user's lower anterior teeth 122 (e.g., each of the lower left canine 70b, each of the lower incisors 68, and the lower right canine 70a) when viewed along the central axis C that is parallel to or coaxial with the Y-axis such that when the user's upper teeth 40 and lower teeth 42 engage the right lateral engagement portion 16a and left lateral engagement portion 16b, a vertical gap G exists between the top surface 60 of the forward portion 28 and a bottom edge of each of the upper central incisors 62 and each of the upper lateral incisors 64. Such a gap G allows the user to drink liquids with the bio-facilitation mouthpiece 10 inserted in the user's mouth. The gap G also allows the user to breathe and talk comfortably while the bio-facilitation mouthpiece 10 is inserted, thereby eliminating the need to frequently remove the bio-facilitation mouthpiece 10 during periods of physical exertion (such as a sporting event).

As illustrated in FIGS. 1, 2, 4, 5, 8, 9 and 10, the base portion also includes a skirt portion 34 that downwardly extends from each of the forward portion 28, the right lateral engagement portion 16a, and the left lateral engagement portion 16b. The skirt portion 34 includes the inside surface 36 and the outside surface 38, and the outside surface 38 generally conforms in shape to an inside surface of the lower teeth and an upper portion of the lower gum line of the user. The skirt portion 34 may include a right rear edge 72, a left rear edge 74, and a lower edge 76 that extends between the right rear edge 72 and the left rear edge 74. The right rear edge 72 may downwardly extend from the inside edge 52a of the bottom portion 24a of the right lateral engagement portion 16a at or adjacent to the second end 20a. The right rear edge 72 may have a shape that follows the natural downward contour of the mouth interior. The left rear edge 74 may downwardly extend from the inside edge 52b of the bottom portion 24b of the left lateral engagement portion 16b at or adjacent to the second end 20b. The left rear edge may have a shape that follows the natural downward contour of the mouth interior. The lower edge 76 may extend from a terminal end of the left rear edge 74 and a terminal edge of the right rear edge 72, and the lower edge 76 may be contoured to correspond with a bottom portion of the user's lower teeth at or adjacent to the user's gum line. Alternatively, the lower edge 76 may be contoured to correspond with a portion of the user's gums a desired distance below the user's gum line. With the lower edge 76 so disposed, the tongue is free to move in the bottom portion of the user's mouth, facilitating the ability of the user to speak clearly with the biofacilitation mouthpiece 10 inserted. The outside surface 38 may include surface impressions 78 that each corresponds to a portion of an inner surface of a corresponding lower tooth such that the portion of the inner surface of the corresponding lower tooth is received into a corresponding cavity of the surface impressions 78.

As illustrated in FIGS. 1 to 6 and 13, the bio-facilitation mouthpiece 10 includes the right flange member 14a and the left flange member 14b, with the right flange 14a member being coupled to the base member 12 adjacent to the right lateral engagement portion 16a and the left flange member 14b being coupled to the base member 12 adjacent to the left lateral engagement portion 16b. More specifically, the right flange member 14a may include an upper flange portion 80a and a lower flange portion 82a. As illustrated in FIG. 1, the upper flange portion 80a may upwardly extend in a vertical or substantially vertical direction from the outer edge 50a of the top portion 22a of the right lateral engagement portion 16a. The upper flange portion 80a may have a rear edge 84a that upwardly extends from a point at or adjacent to the second end 20a of the right lateral engagement portion 16a, and the rear edge 84a may have a curved or contoured shape that is adapted to correspond to the shape of the user's mouth in the area between the user's upper right posterior teeth 44a and an upper interior portion of the user's cheek. The rear edge 84a may be disposed along or adjacent to the middle portion of the user's right upper third molar tooth.

Figure 13:
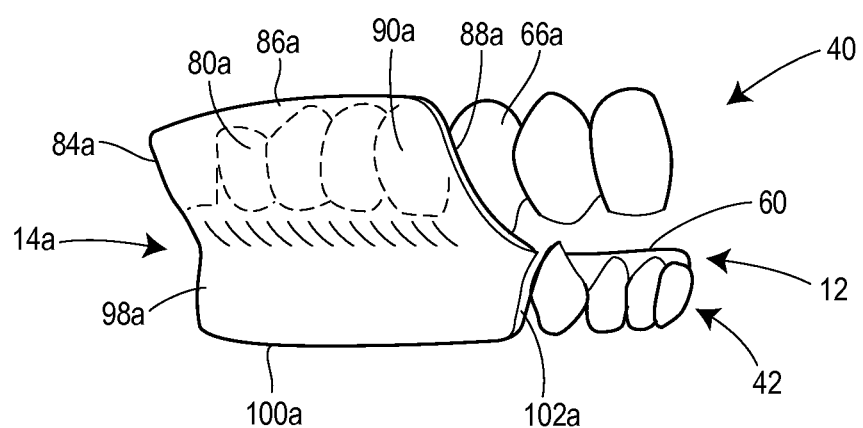
FIG. 13 is a right side view of the embodiment of FIG. 1 disposed in a user's mouth.

As illustrated in FIGS. 1 and 13, an upper edge 86a may extend from the terminal end of the rear edge 84a, and the upper edge 86a may extend to a point at or adjacent to the first end 18a of the right lateral engagement portion 16a. So disposed, the upper edge 86a may be vertically offset from the outside edge 50a of the top portion 22a of the right lateral engagement portion 16a. The intersection of the upper edge 86a and the rear edge 84a may be rounded to avoid sharp corners that may cause discomfort to a user when the bio-facilitation mouthpiece 10 is disposed in a user's mouth. The upper edge 86a may extend along or adjacent to the gum line of the user's upper right posterior teeth 44a, and the upper edge 86a may have a curved, irregular, or contoured shape that is adapted to correspond to the shape of the user's mouth in the area between the user's upper right posterior teeth 44a and an upper interior portion of the user's cheek. The upper flange portion 80a may also have a forward edge 88b that upwardly extends from a point at or adjacent to the first end 18a of the top portion 22a of the right lateral engagement portion 16a to a terminal end of the upper edge 86a. The forward edge 88a may be disposed adjacent to the a rearmost portion of the user's right upper canine tooth 66a or the frontmost portion of the user's right upper first premolar tooth 90b (as illustrated in FIG. 13). The intersection of the upper edge 86a and the forward edge 88a and the intersection of the forward edge 88a and the first end 18a of the right lateral engagement portion 16a may also be rounded to avoid sharp corners that may cause discomfort to a user.

The upper flange portion 80a may have a uniform thickness or a generally uniform thickness such as 3 mm to 4 mm, for example. So configured, the upper flange portion 80 may have the shape of a contoured, rounded plate, and the upper flange portion may have an inside surface 92a and an outside surface 94a. The inside surface 92a may include surface impressions 96a that each correspond to a portion of an outer surface of a corresponding upper right posterior tooth 44a such that the portion of the outer surface of the corresponding upper right posterior tooth is received into a corresponding cavity of the surface impressions 96a. So configured, the user's mandible is prevented from lateral movement that would disengage the user's upper and/or lower teeth from the bio-facilitation mouthpiece 10.

As illustrated in FIGS. 4 and 13, the right flange member 14a may also include the lower flange portion 82a that may downwardly extend in a vertical or substantially vertical direction from the outer edge 54a of the bottom portion 24a of the right lateral engagement portion 16a. The lower flange portion 82a may have a rear edge 98a that downwardly extends from a point at or adjacent to the second end 20a of the right lateral engagement portion 16a, and the rear edge 98a may have a curved or contoured shape that is adapted to correspond to the shape of the user's mouth in the area between the user's lower right posterior teeth 46a and an lower interior portion of the user's cheek. The rear edge 98a may be disposed along or adjacent to the middle portion of the user's right lower third molar tooth. A bottom edge 100a may extend from the terminal end of the rear edge 98a, and the bottom edge 100a may extend to a point at or adjacent to the first end 18a of the right lateral engagement portion 16a. So disposed, the bottom edge 100a may be vertically offset from the outside edge 54a of the right lateral engagement portion 16a. The intersection of the bottom edge 100a and the rear edge 98a may be rounded to avoid sharp corners that may cause discomfort to a user when the bio-facilitation mouthpiece 10 is disposed in a user's mouth. The bottom edge 100a may extend along or adjacent to the gum line of the user's lower right posterior teeth 46a, and the bottom edge 100a may have a curved, irregular, or contoured shape that is adapted to correspond to the shape of the user's mouth in the area between the user's lower right posterior teeth 46a and an lower interior portion of the user's cheek. The lower flange portion 82b may also have a forward edge 102a that downwardly extends from a point at or adjacent to the first end 18a of the right lateral engagement portion 16a to a terminal end of the bottom edge 100a. Alternatively, the forward edge 102a may downwardly extend from a point at or adjacent to the first end 18a of the right lateral engagement portion 16a to a terminal end of the bottom edge 100a. The forward edge 102a may be disposed adjacent to a rearmost portion of the user's right lower canine tooth 70a or the frontmost portion of the user's right lower first premolar tooth 104a. The intersection of the bottom edge 100a and the forward edge 102a and the intersection of the forward edge 102a and the first end 18a of the right lateral engagement portion 16a may also be rounded to avoid sharp corners that may cause discomfort to a user.

The lower flange portion 82a may have a uniform thickness or a generally uniform thickness such as 3 mm to 4 mm, for example. So configured, the lower flange portion 82a may have the shape of a contoured, rounded plate, and the lower flange portion may have an inside surface 108a and an outside surface 110a. The inside surface may include surface impressions 106a that each correspond to a portion of an outer surface of a corresponding lower right posterior tooth 46a such that the portion of the outer surface of the corresponding lower right posterior tooth is received into a corresponding cavity of the surface impression 106a. The inside surface 108a of the lower flange portion 82a of the right flange member 14a may cooperate with the bottom portion of the right lateral engagement portion 24a and the outside surface 38 of the skirt to form a channel 112a that extends from the forward edge 102a of the lower flange portion 82a to the rear edge 98a of the lower flange portion 82a, with the channel 112a adapted to receive one or more of the user's lower right posterior teeth 46a (such as, for example, the lower right first premolar, the lower right second premolar, the lower right first molar, the lower right second molar, and the lower right third molar). So configured, the user's mandible is further prevented from lateral movement that would disengage the user's upper and/or lower teeth from the bio-facilitation mouthpiece 10.

As illustrated in FIGS. 1 to 3, 5, and 6, the left flange member 14b may be a mirror-image (i.e., may be symmetrical or generally symmetrical about a central axis C that is parallel to or collinear with the Y-axis of the reference coordinate system provided in FIG. 1) of the right flange member 14a described above, but the upper flange portion 80b of the left flange member 14b may include an inside surface 92b having surface impressions 96b that each correspond to a portion of an outer surface of a corresponding upper left posterior tooth 44b such that the portion of the outer surface of the corresponding upper left posterior tooth is received into a corresponding cavity of the surface impressions 96b. In addition, the lower flange portion 82b of the left flange member 14b may include an inside surface 108b having surface impressions 106b that each correspond to a portion of an outer surface of a corresponding lower left posterior tooth 46b such that the portion of the outer surface of the corresponding lower left posterior tooth is received into a corresponding cavity of the surface impressions 106b. So configured, the inside surface 108b of the lower flange portion 82b of the left flange member 14b may cooperate with the bottom portion 24b of the left lateral engagement portion 16b and the outside surface 38 of the skirt portion 34 to form a channel 112b that extends from the forward edge 102b of the lower flange portion 82b to the rear edge 98b of the lower flange portion 82b, with the channel 112b adapted to receive one or more of the user's lower left posterior teeth 46b (such as, for example, the lower left first premolar, the lower left second premolar, the lower left first molar, the lower left second molar, and the lower left third molar).

The bio-facilitation mouthpiece 10 may be fabricated as a single, unitary piece, or may be an assembly or two or more pieces that are fixed by any method known in the art, including using adhesives, ultrasonic welding, or mechanical fastening, for example. The bio-facilitation mouthpiece 10 may be comprised of any suitable material. For example, the bio-facilitation mouthpiece 10 may be made from a soft, flexible silicone material or copolymer material. Alternatively, the bio-facilitation mouthpiece 10 may be made from a heat cured flexible resin. For example, the bio-facilitation mouthpiece 10 made be made from SR Ivocap elastomer or Odontosil silicone.

Figure 7:
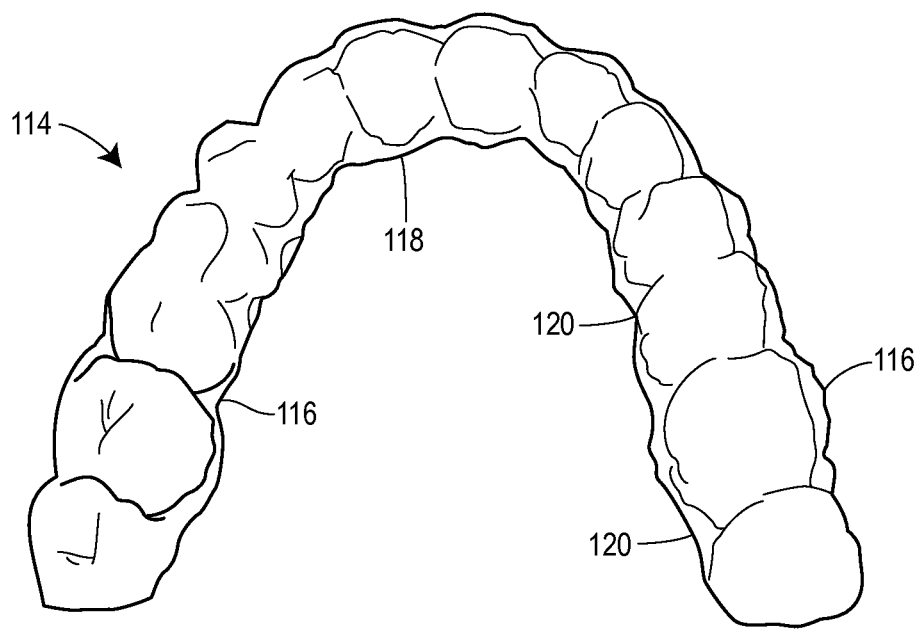
FIG. 7 is a perspective top view of an embodiment of an upper component.

An upper component 114 (illustrated in FIG. 7) may be used along with the bio-facilitation mouthpiece 10 to provide protection to a user's upper anterior teeth. The upper component 114 may be configured to be received on a user's upper (maxillary) teeth and is formed to substantially conform to the contours of the user's upper teeth. The upper component 114 may include an upper edge 116 that is contoured to replicate a user's gum line. In certain embodiments, the upper edge 116 is configured such that it will not contact the user's gums. The upper edge 116 may include curved apexes 118 that occur toward the middle of each tooth, and curved valleys 120 that occur between teeth. The curved apexes 118 and curved valleys 120 may avoid tearing associated with pointed apexes and valleys. The upper component 114 may span a user's entire upper dental arch, including the rearmost molars. However, in certain embodiments, an upper component 114 may not span a user's full upper dental arch. The upper component 114 may be made of any suitable material. For example, the upper component 114 may be made from a soft, flexible copolymer or silicone, or the upper component may be made from a polypropylene/ethylene copolymer material.

Figure 6:
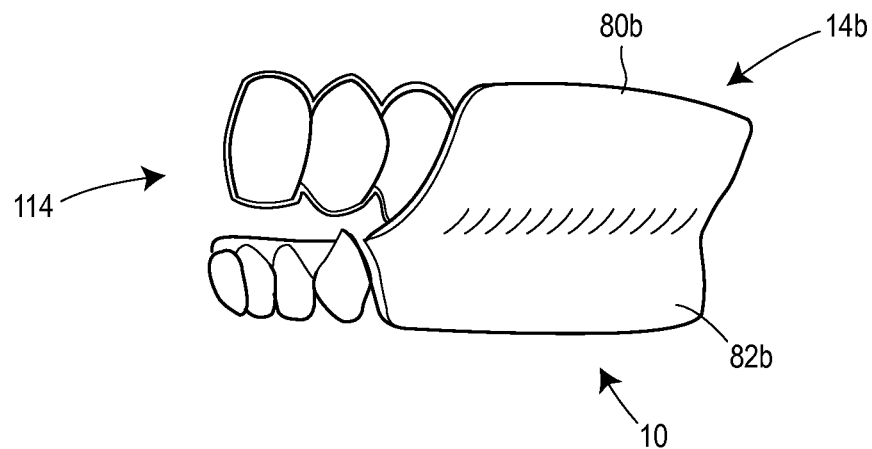
FIG. 6 is a left side view of the embodiment of FIG. 1 disposed in a user's mouth with an upper component disposed over the user's upper teeth.
Figure 8:
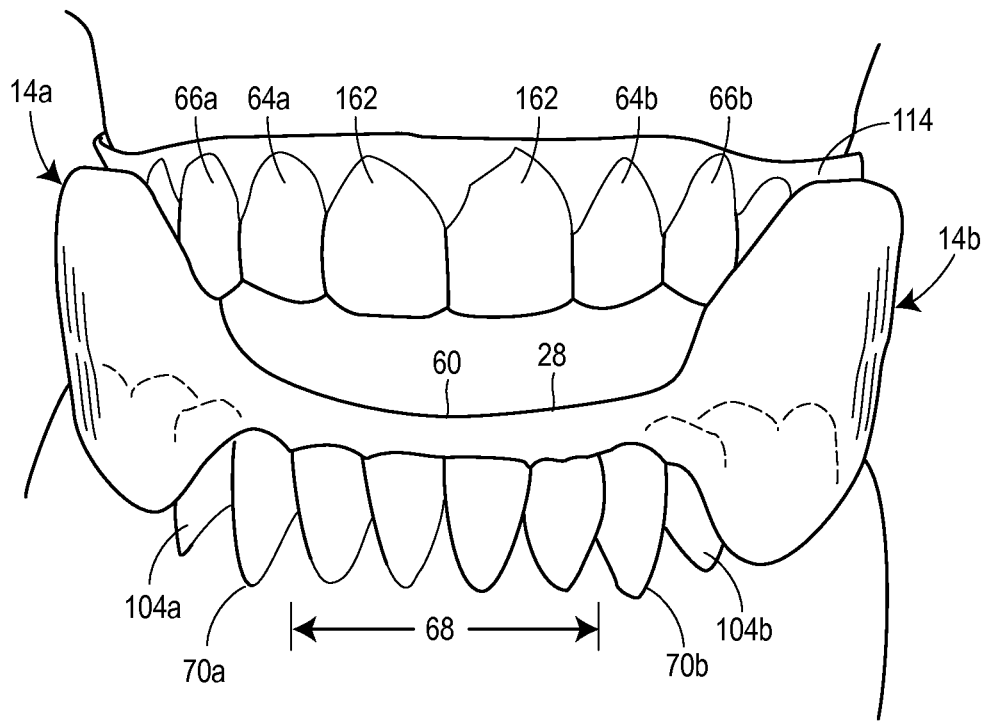
FIG. 8 is a front view of the embodiment of FIG. 1 disposed in a user's mouth with an upper component disposed over the user's upper teeth.
Figure 9:
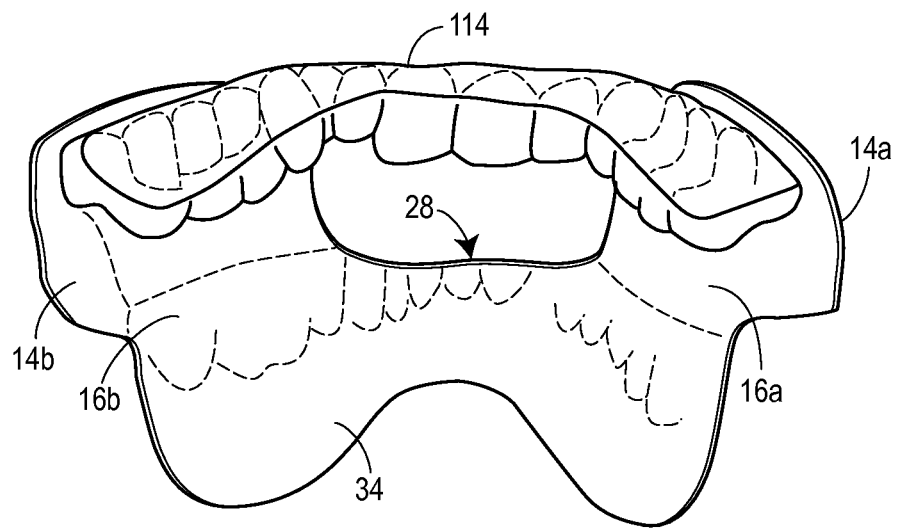
FIG. 9 is a rear view of the embodiment of FIG. 1 disposed in a user's mouth with an upper component disposed over the user's upper teeth.
Figure 10:
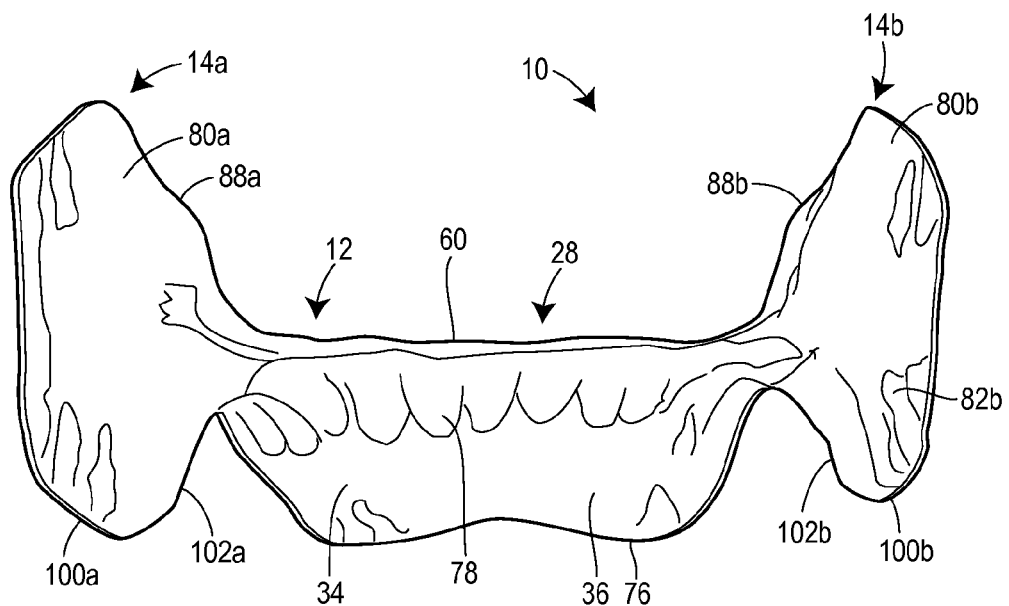
FIG. 10 is a front view of the embodiment of FIG. 1 without the upper component.

The upper component 114 may be formed as a separate and distinct component from the bio-facilitation mouthpiece 10, and a user may optionally position the upper component 114 over the user's upper teeth prior to inserting the bio-facilitation mouthpiece 10. So positioned, as illustrated in FIGS. 6, 8, and 9, portions of the upper component 114 that correspond to the bottom portions of the user's right and left upper posterior teeth 44a, 44b may be received into corresponding surface impressions 26a, 26b formed in the top portion 22a, 22b of each of the right lateral engagement portion 16a and the left lateral engagement portion 16b, and portions of the upper component 114 that correspond to the outside portions of the user's right and left upper posterior teeth 44a, 44b may be received into corresponding surface impressions 96a, 96b formed on the inside surface 92a, 92b of each of the right upper flange portion 80a and the left upper flange portion 80b. The upper component 114 may be used when a user is participating in a contact sport to provide extra protection for the upper anterior teeth that are not protected by the bio-facilitation mouthpiece 10.

To fabricate the bio-facilitation mouthpiece 10, manual muscle testing is employed to identify a user's unique maxillomandibular position of minimal nociceptive input. It has been found that an optimal maxillomandibular relationship (i.e., the positioning of the mandible, or lower jaw, relative to the maxilla, or upper jaw) exists that enhances neurological function by channeling the nervous system to eliminate nociceptive input. That is, with the maxilla and mandible in an optimal position, neurological clutter is minimized and, as a result, neurological performance, and thus athletic performance, is enhanced.

Manual muscle testing may be employed to identify when nociceptive input is minimized. Generally speaking, manual muscle testing is used to assess changes in muscle function brought about in the central integrative system of the brain's anterior horn motoneurons. The regulation of muscle function is accomplished at a subconscious level. Function and movement are generated by the premotor and motor cortex of the brain and sent to the reticular activating system, hypothalamus and limbic system. A manual muscle test is conducted by having the user resist a challenge to the target muscle or muscle group while a clinician applies a force. Maximum performance of a muscle in response to manual muscle testing demonstrates low nociceptive input (called "facilitation" or "bio-facilitation") to the central integrative system of the brain.

Manual muscle testing, therefore, allows a clinician to identify an optimal maxillomandibular relationship that results in enhanced athletic performance. That is, when the maxillomandibular relationship is optimized, the user's head is placed in a balanced physiological position on the spinal column that reduces neck stress, and nociceptive input is minimized. Correspondingly, maximum performance of a muscle in response to manual muscle testing demonstrates low nociceptive input. Accordingly, by varying the maxillomandibular relationship and performing related manual muscle testing, a maxillomandibular position (i.e., the optimal maxillomandibular position) can be identified that corresponds with maximum neurologic performance by the user based on facilitation of the central integrative system.

A commonly known and very basic manual muscle test is the isometric deltoid press, where the user resists as the clinician exerts a downward force on an extended arm. Proper positioning is paramount to ensure that the muscle in question is isolated or positioned as the prime mover, minimizing interference from adjacent muscle groups. The ability of the user to maintain the test position against the pressure exerted in the manual muscle test (e.g., the downward force on the extended arm) is an indicator of maximum performance. Instead of the isometric deltoid press, any strong, healthy muscle may be tested to identify performance facilitation of a muscle.

To identify the user's optimal maxillomandibular position, a practitioner may insert a first bite registration device (also known as a bite shim) between the anterior teeth of the user, and the user may move the upper and lower anterior teeth into contact with (or immediately adjacent to) a top surface and a bottom surface, respectively, of the bite shim. The bite shim may be identical to that disclosed in U.S. patent application Ser. No. 13/014,848, the content of which is incorporated herein by reference. The bite shim may be a plastic, arcuate wafer having a predetermined, uniform thickness (such as, for example, 1.5 mm) and the bite shim may be dimensioned and shaped to correspond to the user's anterior dental arch.

With this first bite shim so disposed, the clinician may initiate the manual muscle test, such as the isometric deltoid press, on the user. Accordingly, the user may stand up straight, place the dorsal portion of the user's tongue against the roof of the mouth, and extend a right arm away from the user's body such that the right arm is substantially horizontal. In this position, the clinician may exert a downward force on the user's extended right arm. While the bite shim is designed to maintain a constant and known vertical separation between the upper and lower jaw, the clinician may vary the user's lateral and protrusive maxillomandibular position (i.e., varying the relative lateral position and the relative longitudinal position, respectively, of the user's upper and lower jaw) while performing the manual muscle test to identify the user's optimal vertical, lateral, and protrusive maxillomandibular position. If the clinician identifies a maximum performance in response to the manual muscle test (e.g., adequately resisting the downward force in the isometric deltoid press), an impression (that will be described in more detail below) will be taken of the user's upper and lower anterior teeth relative to the bite shim to record the user's optimal vertical, lateral, and protrusive maxillomandibular position.

If the clinician notes that maximum performance has not been achieved, a second bite shim may be vertically stacked on the first bite shim. The stacked first and second bite shims may be inserted between the anterior teeth of the user, and the user may and the user may move the upper and lower anterior teeth into contact with (or immediately adjacent to) a top surface and a bottom surface, respectively, of the stacked first and second bite shims. The first and second bite shims may be identical, and surface features may be provided on each of the adjacent surfaces of the first and second bite shims to prevent mutual lateral displacement. With this first and second bite shims so disposed, the clinician may again vary the user's relative lateral and protrusive maxillomandibular position and perform the manual muscle test, such as the isometric deltoid press, on the user. If the clinician identifies a maximum performance in response to the isometric deltoid press, an impression will be taken of the user's upper and lower anterior teeth relative to the stacked first and second bite shims. However, if the clinician notes that maximum performance has not been achieved, a third bite shim may be stacked on the first and second bite shims, and the isometric deltoid press is repeated. Additional bite shims may be added in successive isometric deltoid presses until the clinician identifies a maximum performance.

As explained above, when the clinician identifies a maximum performance in response to the manual muscle test, an impression will be taken of the user's upper and lower anterior teeth relative to the bite shim(s) that corresponds to the user's optimal vertical, lateral, and protrusive maxillomandibular position. To take such an impression, wax or any other suitable material is applied to the upper surface of a top bite shim (i.e., the surface in contact with the upper anterior teeth) and a lower surface of a bottom bite shim (i.e., the surface in contact with the lower anterior teeth) or a lower surface of the top bite shim if only a single bite shim is required. The bite shim(s) may then be positioned in the mouth of the user, and the user may position the upper and lower anterior teeth into contact with (or immediately adjacent to) a top surface and a bottom surface, respectively, of the bite shims(s) in the same position in which the upper and lower anterior teeth were disposed during the maximum performance in the manual muscle test. After a suitable amount of curing time (such as 90 seconds, for example), the bite shim(s) and the hardened wax impressions that are secured to the bite shim(s) may be removed from the user's mouth and may be stored prior to beginning the next fabrication step.

Figure 11:
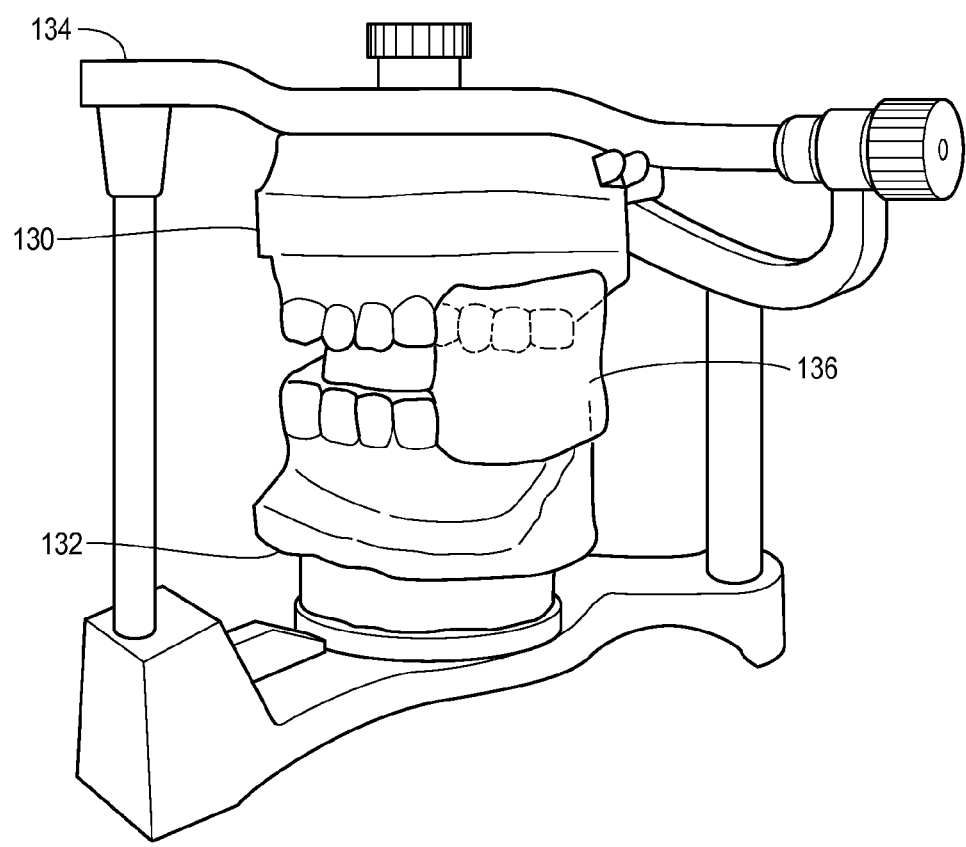
FIG. 11 is a perspective view of upper and lower casts mounted to an articulator.
Figure 12:
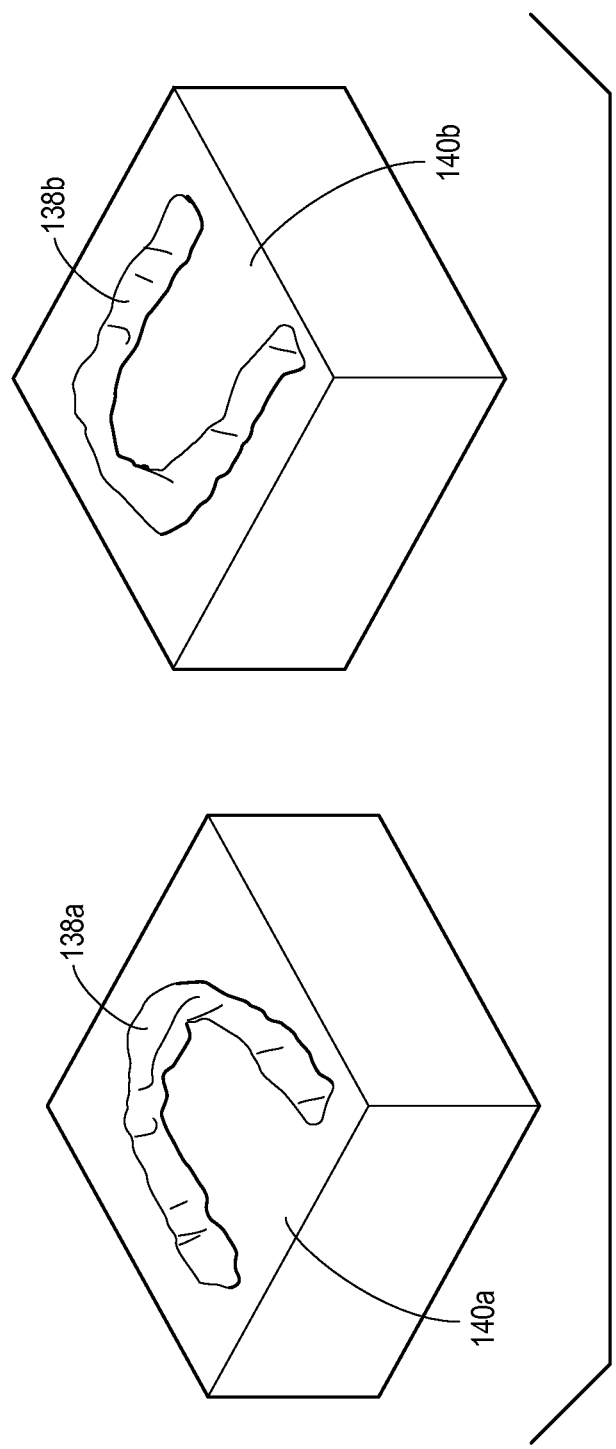
FIG. 12 is a perspective view of a first mold half and a second mold half with a cavity formed in each mold half.

The fabrication of the bio-facilitation mouthpiece 10 may also require the creation of a plaster cast of the user's dental arches. To make such a cast, a dental model using a type-4 dental plaster conforming to ISO standard 6873:1998, such as Hydrocal 105, for example, is poured into an upper impression and a lower impression of the user's teeth. Once the impressions set, they become casts. As illustrated in FIG. 11, the upper cast 130 and lower cast 132 are then secured to an articulator 134 (as illustrated in FIG. 11), and the hardened wax impression and bite shim(s) (not shown) are positioned over the appropriate corresponding teeth. By way of the articulator 134 and the hardened wax impressions, the user's upper and lower casts are positioned to replicate the user's optimal maxillomandibular position that corresponds to the maximum performance in response to the isometric deltoid press. The hardened wax impressions and/or the bite shim(s) are removed, and wax may then be applied to the upper and lower casts 130, 132 to approximate the shape and thickness of the bio-facilitation mouthpiece 10, as illustrated in FIG. 11. The clinician may apply the wax to produce a sacrificial wax mouthpiece 136 that exactly corresponds to the shape and thickness of the final bio-facilitation mouthpiece 10. Alternatively, the clinician may apply the wax to produce a sacrificial wax mouthpiece 136 that has excess material (e.g., covers a greater area then the final bio-facilitation mouthpiece 10) such that he clinician may trim away material on the final bio-facilitation mouthpiece 10 to correspond to the contours of the user's mouth. The wax is allowed to dry, and the hardened sacrificial wax mouthpiece 136 is removed from the upper and lower casts 130, 132.

A mold is then made from the hardened sacrificial wax mouthpiece 136 by embedding the hardened sacrificial wax mouthpiece 136 in plaster. The mold is cut along a central longitudinal plane, and the hardened sacrificial wax mouthpiece is then boiled out of the mold, leaving a cavity 138a, 138b in each of the mold halves 140a, 140b. The mold halves 140a, 140b are then secured together within a brass flask, and liquid material is injected into the cavity formed within the mold halves. To prevent the formation of air bubbles in the material, a pressure may be exerted on the brass flask by a flask clamp, and the pressure may be maintained until the end of the curing time. For example, the pressure may be three bar and the curing time may be 30 minutes to up to 5 hours depending on the mouthpiece material chosen. Curing may occur at room temperature or at an elevated temperature and/or pressure. When the material has cured, the bio-facilitation mouthpiece 10 may be removed from the mold halves. Because the material may be resilient and flexible, undercuts formed on the surface of the teeth will not affect the removal of the bio-facilitation mouthpiece from the mold. Additional finishing procedures, such as, for example, trimming, smoothing, deburring, polishing, and/or lacquering, may then be completed.

Instead of using a mold to fabricate the mouthpiece, the bio-facilitation mouthpiece 10 may be generated suing three-dimensional scanning and printing. Specifically, a prototype mouthpiece (not shown) may be created using wax (or any other suitable material) in a manner identical to the creation of the sacrificial wax mouthpiece described above. The prototype mouthpiece may exactly correspond to the shape and thickness of the final bio-facilitation mouthpiece 10. When the prototype mouthpiece has properly cured, the prototype mouthpiece may be removed from the upper and lower casts 130, 132. The prototype mouthpiece may then be scanned by a three-dimensional scanner to create a computer model of the prototype mouthpiece. The computer model may then be provided to a three-dimensional printer, and a final bio-facilitation mouthpiece 10 may be generated by the three-dimensional printer using a desired material. Additional finishing procedures, such as, for example, trimming, smoothing, deburring, polishing, and/or lacquering, may then be completed. Any suitable method or type of three-dimensional scanning and/or three-dimensional printing or model generation (such as, for example, stereolithography, selective laser sintering, and fused deposition modeling) may be used to fabricate the bio-facilitation mouthpiece 10.

In an additional manufacturing step, the upper component 102 may be vacuum formed over the cast of the user's upper dental arch and trimmed as needed to form the curved apexes and curved valleys described above.

The bio-facilitation mouthpiece 10 described above provides a custom laboratory fabricated non-thermoplastic mouthpiece of either soft, silicone type material or flexible resin whose design allows the user to speak clearly, easily breathe orally, drink liquids with the device in place, while offering concussion protection and tooth protection. Wearing the bio-facilitation mouthpiece 10 facilitates neurological performance of the user by reducing neurological clutter, and the user's head is placed in a balanced physiological position on the spinal column that reduces neck stress. Such a custom laboratory fabricated appliance brings about bio-facilitation of a wide range of human physiologic functions or correction of dysfunctions such as temporomandibular joint pain, headaches, neck pain, daytime airway patency, treatment of certain movement disorders, enhance isotonic head, neck, and body posture, head balance, and enhances neurological performance by reducing nociceptive clutter.

While various embodiments have been described above, this disclosure is not intended to be limited thereto. Variations can be made to the disclosed embodiments that are still within the scope of the appended claims.

What is claimed is:

1. A method of fabricating a bio-facilitation mouthpiece for a user, the method comprising:
   identifying a user's maxillomandibular position of minimal nociceptive input;

creating an impression of the user's upper and lower anterior teeth in the maxillomandibular position of minimal nociceptive input; and creating a bio-facilitation mouthpiece from the impression of the user's upper and lower anterior teeth in the maxillomandibular position of minimal nociceptive input, wherein the user's maxillomandibular position of minimal nociceptive input is maintained by the bio-facilitation mouthpiece when the user wears the bio-facilitation mouthpiece, and wherein identifying a user's unique maxillomandibular position of minimal nociceptive input includes inserting a first bite shim between the upper and lower anterior teeth of a user while conducting manual muscle testing such that the user's optimal vertical, lateral, and protrusive maxillomandibular position is recorded relative to the first bite shim, and wherein a second bite shim is disposed in contact with the first bite shim, and the first and second bite shims are inserted between the upper and lower anterior teeth of a user while conducting manual muscle testing such that the user's optimal vertical, lateral, and protrusive maxillomandibular position is recorded relative to the first and second bite shims.

2. The method of claim 1, wherein the manual muscle testing uses isometric resistance as a challenge to a healthy indicator muscle.

3. The method of claim 1, wherein creating an impression of the user's upper and lower anterior teeth involves making a wax impression of the user's upper and lower anterior teeth relative to the first bite shim.

4. The method of claim 1, wherein creating a bio-facilitation mouthpiece from the impression of the user's upper and lower anterior teeth in the maxillomandibular position of minimal nociceptive input further comprises:

creating upper and lower casts of the user's dental arches;

placing the impression between the anterior teeth of the upper and lower casts to replicate the maxillomandibular position of minimal nociceptive input;

applying wax to the upper and lower casts to establish the shape and thickness of the bio-facilitation mouthpiece to create a sacrificial wax mouthpiece;

generating a plaster mold of the bio-facilitation mouthpiece using the sacrificial wax mouthpiece;

removing the sacrificial wax mouthpiece from the plaster mold;

injecting material into a cavity formed in the plaster mold by the removal of the sacrificial wax mouthpiece;

allowing the material to cure within the cavity of the plaster mold; and removing the bio-facilitation mouthpiece from the cavity of the plaster mold.

* * * * *